Jan. 14, 1930.  R. A. BLISH ET AL  1,743,104
DRINK MIXER
Filed May 4, 1929   2 Sheets-Sheet 1
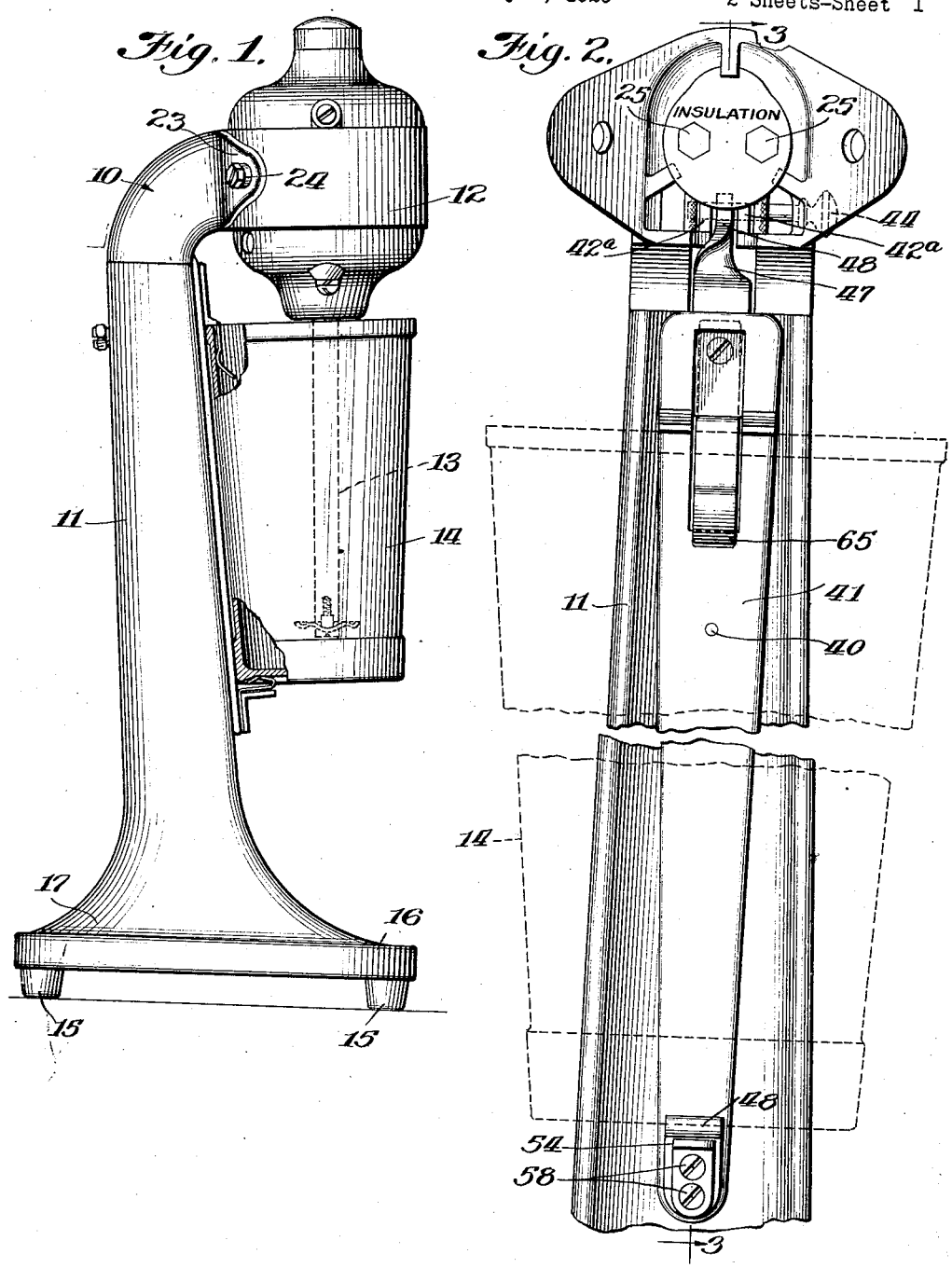
Inventors:
Russell A. Blish
Arthur P. Jorgenson
By Williams, Bradbury, McCaleb & Hinkle
Attys.

Jan. 14, 1930.  R. A. BLISH ET AL  1,743,104
DRINK MIXER
Filed May 4, 1929  2 Sheets-Sheet 2
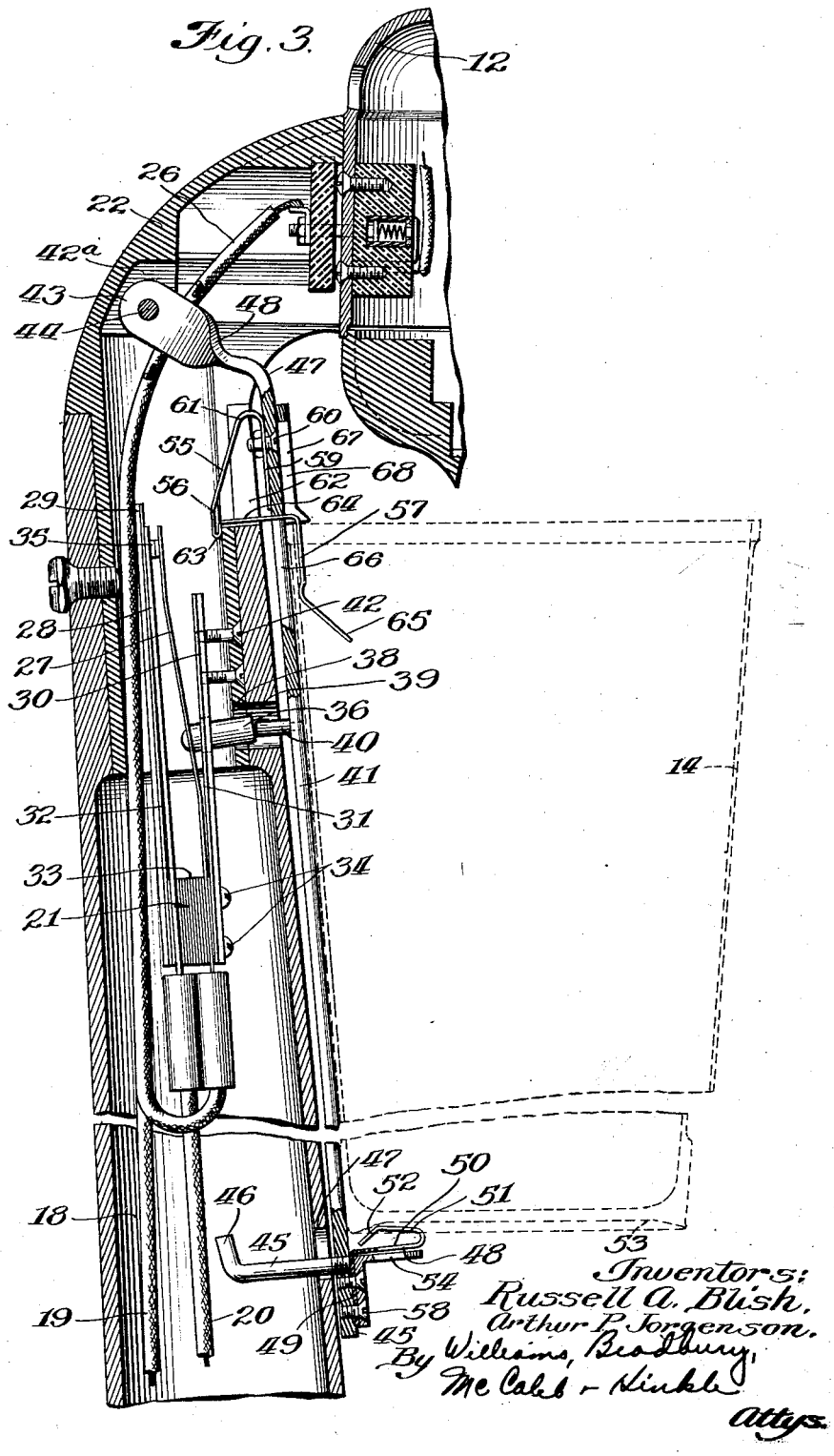

Patented Jan. 14, 1930

1,743,104

UNITED STATES PATENT OFFICE

RUSSELL A. BLISH AND ARTHUR P. JORGENSON, OF RACINE, WISCONSIN, ASSIGNORS TO ARNOLD ELECTRIC CO., OF RACINE, WISCONSIN, A CORPORATION OF WISCONSIN

DRINK MIXER

Application filed May 4, 1929. Serial No. 360,454.

The present invention relates to drink mixers, and is particularly concerned with drink mixers adapted to be actuated by the placing of a receptacle in operative position, or by the weight of the receptacle or its contents.

In drink mixers of this type, it is highly desirable that the receptacle be firmly secured in operative position about the mixer agitator to prevent rattling, splashing or spilling, and it is also desirable that the motor control switch be positively actuated to prevent vibration of the contacts and the consequent arcing which results in burning and pitting the contacts.

It is also necessary to reduce to a minimum the number of operations or movements required in the use of the mixer, so that an operator may serve a greater number of people with a minimum expenditure of time and effort, and consequently the device employed to accomplish the foregoing results should preferably be actuated coincident to the placing of the receptacle in operative position, as by the act of placing the receptacle or by the weight of the receptacle or its contents.

One of the objects of the present invention is the provision of a drink mixer which includes common means actuated by the placing of the receptacle for simultaneously securing the receptacle in operative position and accomplishing positive actuation of the motor control switch.

Another object is the provision of a drink mixer having resilient means for securing the receptacle against rattling and for simultaneously latching the motor control switch in closed position.

Another object is the provision of a drink mixer having means actuated by the removal of the receptacle for releasing said receptacle and for releasing a motor control switch which is positively secured in closed position during the operation of the mixer.

Another object is the provision of a drink mixer having a pivoted receptacle support for actuating a motor control switch, said support being resiliently held in receptive position by said switch, and means carried by said support for securing a receptacle thereon and for holding said support in position to positively secure the switch against vibration.

Another object of the invention is the provision of a drink mixer having a motor adapted to be controlled by the placing of a receptacle in operative position, and having common means for engaging the top of a receptacle and for latching a switch actuating member in closed position.

Other objects and advantages of the invention will be apparent from the following description and from the accompanying drawings, in which similar characters of reference indicate similar parts throughout the several views.

Referring to the drawings, of which there are two sheets;

Fig. 1 is a side elevational view of the drink mixer and receptacle with the parts in the operative position of the mixer, that is, with the switch closed and the motor running;

Fig. 2 is a front elevational view of the standard and motor support with the motor removed and receptacle shown in dotted lines;

Fig. 3 is a sectional view taken on the plane of the line 3—3 of Fig. 2 showing the switch mechanism.

Referring to Fig. 1, 10 indicates the drink mixer assembly in its entirety, the mixer preferably including a support or standard 11, a motor 12, an agitator 13 driven by the motor 12 and a receptacle 14.

In the embodiment chosen to illustrate the invention, the standard 11 comprises a cast invention, the standard 11 comprises a cast metal base 17 having rubber feet 15 and a pair of forwardly extending portions 16 for guiding the receptacle into operative position. The base 17 is provided with a hollow interior conduit 18 for receiving the conductors 19 and 20 leading to a supply circuit, and for receiving an electric switch 21 for controlling the motor circuit. The standard 11 may be provided with a separate motor head 22 comprising a hollow cast metal member having a pair of curved attaching flanges 23 for engaging the casing of the motor 12 and for securing said motor to the standard by a pair of bolts 24. The motor head 22 is provided with contacts 25 adapted to engage contacts carried by the motor 12 and one conductor 19 may be connected to one of the contacts 25. The other contact 25 is connected by a conductor 26 to a movable switch contact 27, while the supply conductor 20 is connected to the fixed switch contact 28 so that the switch contacts are adapted to make and break the motor circuit.

The switch 21 may comprise a frame consisting of a pair of metal plates 29 and 30 separated by layers of insulation 31 and 32 from the resilient contact members 27 and 28.

The metal plates 29 and 30, contact springs 27 and 28 and the spacing members 33 of insulation may all be clamped together by a pair of screw bolts 34 passing through the plate 30, contacts and insulation and threaded into the plate 29, it being understood that the contact springs 27 and 28 are provided with enlarged apertures about the bolts 34 to effectively insulate the contact springs from each other and from the supporting plates.

The contact springs 27 and 28 may be provided with aligned contact points 35 and the movable contact spring 27 is provided with an actuating member or button 36 adapted to project through an aperture 38 in plate 20 and an aperture 39 in the standard 11 so that it may be engaged by a pin 40 carried by the receptacle support 41.

The switch 21 may be secured in the standard by a pair of screw bolts 42 passing through the neck of the motor head 22 and threaded into the plate 30, drawing the edges of the plate into engagement with the substantially cylindrical bore or conduit in the motor head 22.

The motor head 22 is provided upon its interior with a pair of forwardly projecting lugs 42ª spaced to receive the end 43 of motor support 41 and one of the lugs 42ª may be threaded to receive the end of a screw bolt 44 adapted to project into the motor head 22 through the lugs 41 for pivotally supporting the end 43 of motor support 41. In some embodiments of the invention, the motor head and base 17 may constitute an integral piece, but the provision of a separate motor head facilitates the assembly of the parts of the device with a minimum expenditure of time and labor. It should also be understood that the present invention is not limited to the use of a specific type of receptacle support and other types of receptacle carriers may be used within the scope of the appended claims.

The receptacle support 41 comprises an elongated strip of sheet metal which may taper toward its lower end 45 and the receptacle support may be laterally curved to present a forward concave face 46 for better receiving the complementary surface upon the receptacle 14.

At its upper end the lever 41 is bent at 47 so that the upper end 43 may extend into the standard 11, while the main body of the lever 41 extends longitudinally of the standard. The end 43 may also be twisted at 48 through an angle of substantially 90 degrees, so that the end 43 may lie in a plane at right angles to the bolt 44 which pivotally supports this end of the lever.

The receptacle support 41 is provided adjacent its lower end with a stop device for limiting the counter-clockwise rotation of the lever 41, which may comprise a pin 45 having one end threaded into the rear side of the lever 41 and having its opposite end bent up as at 46 to form a stop device to engage inside the standard 11 adjacent the aperture 47.

The lower end 45 of the receptacle supporting lever 41 is also provided with means for engaging the bottom of the receptacle 14, which may comprise a resilient sheet metal member 48 having an attaching flange 49, a flange 50 at right angles to the attaching flange, a flange 51 sloping upward toward the lever 41 and a flange 52 sloping downward toward lever 41. The flange 51 forms a camming surface adapted to be engaged by the lower edge of the receptacle 14 when the receptacle is placed in operative position, and the flange 52 forms a resilient shoulder for engaging a complementary annular shoulder 53 carried by the receptacle 14.

The spring 48 may be secured to a lever 41 by the same screw bolts 58 which secure a right angle metal bracket 54, which is adapted to provide a reinforcing stop member for the spring 48. The stop member 54 is adapted to reinforce the spring 48 so that it will not be bent out of shape by severe usage.

The receptacle 14 preferably comprises a sheet metal member of substantially the shape shown, which is provided with a depending annular shoulder 53 upon its bottom adjacent the outer edge. In the present embodiment, the annular shoulder 53 comprises a substantially frustoconical portion, but any equivalent shape of shoulder may be used. When the receptacle 14 is not in the operative position shown in Figs. 1 and 3, the receptacle support 41 is resiliently urged away from the standard 11 by the contact spring 27 acting through the pins 36 and 40 and the contact points 35 are open.

The receptacle supporting lever 41 is also provided with means for securing an upper part of the receptacle and for simultaneously holding the switch 21 in closed position. The means for accomplishing this result may consist of a sheet metal spring 55 carried by the rear side of lever 41 and formed to provide a shoulder 56 for latching lever 41 in the position of Fig. 3 with contact points 35 closed, and with a shoulder or hook 57 for engaging inside the upper portion of receptacle 14.

The spring 55 may thus be formed with an attaching flange 59 secured to the lever 41 by screw bolt 60, and the spring is bent back upon itself at 61 to extend into a rectangular aperture or slot 62 formed in the standard 11 and motor head 22. The spring 55 is again bent upward at 63 forming the latching shoulder 56, and the spring is bent outward to form a horizontal portion 64 equal in length to the distance from the inside of the motor head to the inside of the receptacle 14 when the switch actuating lever 41 is in the position of Fig. 3.

The spring 55 is also bent downward to form the shoulder 57 for retaining the receptacle 14 and the lower end of the spring is bent outward and downward to form a guide 65 for guiding the upper edge of the receptacle behind shoulder 57.

It should also be noted that the lever 41 is provided with an aperture 66 of substantially rectangular shape adapted to receive the parts 57 and 65 of spring 55 when the receptacle is removed and when the receptacle 14 is removed the spring 55 is adapted to move toward the left in Fig. 3 so that the shoulder 56 does not engage standard 11 and the spring does not interfere with movement of lever 41.

If desired, the receptacle supporting lever 41 may also be provided with a stop member 67 for definitely limiting the upward movement of the receptacle, and the stop member 67 is also provided with a slot 68 for permitting movement of spring 55. When the stop member 67 is not employed, the upper edge of the receptacle may be engaged directly by portion 64 of spring 65.

The operation of the drink mixer is as follows: When the receptacle 14 is removed from the mixer for filling it with the ingredients to be mixed, the lever 41 is moved by contact spring 27 counter-clockwise to a position where the stop pin 45 engages inside standard 11 at the aperture 47. The parts are now in receptive position for the receptacle. The switch contact points 35 are open and the motor 12 is deenergized.

The operator may then slide the receptacle 14 in below the agitator 13, sufficient clearance being provided between the end of the agitator and the table or other support to permit the receptacle 14 to clear the bottom of the agitator. The edge of the receptacle 14 is passed between the agitator and the spring 48 and moved upward to a position where the edge of the receptacle is received behind the shoulder 57, being guided into place by the flange 65.

As the receptacle is forced between flange 57 and lever 41, the shoulder 56 engages the inside of the motor head or standard and the lever 41 is moved to the position of Fig. 3, the pin 40 engaging button 36 and forcing the contact points 35 into engagement. The bottom of the receptacle may then be pivoted clockwise (Fig. 3), its lower edge engaging flange 51 of the lower spring 48 and camming the spring downward until the annular shoulder 53 is seated behind resilient shoulder 52. The receptacle is then secured between the stop member 67 and the spring 48, being seated against the concave surface 46 of lever 41 and at the same time the switch 21 is securely fastened in closed position.

It will thus be observed that the present device is adapted to simultaneously secure the switch in closed position and secure the receptacle in operative position, and the foregoing results are accomplished by the mere placing of the receptacle in operative position. The receptacle 14 may be removed by a reverse movement, after which the removal of the upper edge from beneath flange 57 of spring 55 will permit the lever 41 to pivot counterclockwise and the contacts 35 will be opened.

The present device is thus adapted to eliminate any objectionable rattling of the container relative to its support, and to eliminate vibration at the contact points 35, thereby insuring smooth operation of the drink mixer. These results are nevertheless accomplished without increasing the number of operations required by the use of the drink mixer, and the operator not only places the receptacle in operative position, after which the switch may be actuated by the weight of the receptacle or its contents, but the switch is secured in closed position during the operation of the motor.

While we have illustrated and described a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a drink mixer, the combination of a standard with a motor, a motor switch, an agitator, a receptacle support for actuating said switch and a resilient member carried by the receptacle support for securing a receptacle thereon and simultaneously securing said switch in closed position, comprising a spring having a shoulder for engaging a shoulder on said standard and having a hook for engaging an upper portion of said receptacle.

2. In a drink mixer, the combination of a standard with a motor, an agitator, a motor switch, a pivoted receptacle support carried by said standard and adapted to actuate said switch, means for engaging the bottom of a receptacle, and means for engaging the top of said receptacle and for simultaneously latching said switch in closed position.

3. In a drink mixer, the combination of a standard with a motor, an agitator, a motor switch, a pivoted receptacle support carried by said standard and adapted to actuate said switch, means for engaging the bottom of a receptacle, and means for engaging the top of said receptacle and for simultaneously latching said switch in closed position, comprising a spring carried by the upper end of said receptacle support having a shoulder to engage said standard and a hook for engaging a receptacle.

4. In a drink mixer, the combination of a motor supporting member with a motor control switch, a receptacle carrier, carried by said motor supporting member, securing means carried by said receptacle carrier, for engaging an upper part of a receptacle, operative mechanical connections between said receptacle supporting member and said motor control switch, means for engaging the bottom of a receptacle, said securing means being actuated by the placing of a receptacle to secure said switch and said receptacle supporting member in predetermined position.

5. In a drink mixer, the combination of a motor supporting member with a motor control switch, a receptacle carrier, carried by said motor supporting member, securing means carried by said receptacle carrier, for engaging an upper part of a receptacle, operative mechanical connections between said receptacle supporting member and said motor control switch, means for engaging the bottom of a receptacle, said securing means being actuated by the placing of a receptacle to secure said switch and said receptacle supporting member in predetermined position, and said securing means comprising a resilient member formed with an attaching flange, a receptacle engaging flange, and a motor support engaging flange.

In witness whereof, we hereunto subscribe our names this 30th day of April, 1929.

RUSSELL A. BLISH.
ARTHUR P. JORGENSON.